Figure 1:
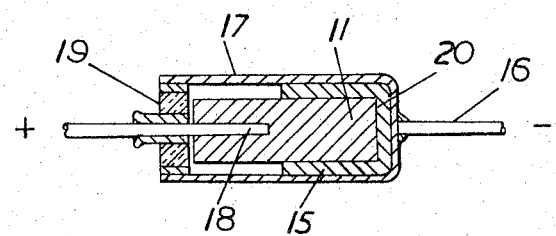

April 18, 1967     EIICHI OKAMOTO ET AL     3,314,124

METHOD OF MANUFACTURING SOLID ELECTROLYTIC CAPACITOR

Filed March 10, 1964

Inventor
E. OKAMOTO - M. KOIKE
By
Attorney 3,314,124
METHOD OF MANUFACTURING SOLID ELECTROLYTIC CAPACITOR
Eiichi Okamoto and Masasi Koike, Tokyo, Japan, assignors to Nippon Electric Company, Limited, Tokyo, Japan, a corporation of Japan
Filed Mar. 10, 1964, Ser. No. 350,804
Claims priority, application Japan, Mar. 22, 1963, 38/15,045
6 Claims. (Cl. 29—25.31)

This invention relates to solid electrolytic capacitors having small leakage current and to a method of manufacturing said solid electrolytic capacitor and more particularly to a method of forming the manganese dioxide layer of said capacitor.

An object of the invention is to provide an electrolytic capacitor having small leakage current.

Another object of the invention is to provide an electrolytic capacitor having high working voltage.

According to the invention, there is provided a method of manufacturing a solid electrolytic capacitor having a metal body anode such as a sintered tantalum body, on which an oxide film may be formed. An oxide dielectric film is formed on the metal body; and a manganese dioxide layer is deposited on the oxide film. A cathode layer of a conductive material, such as colloidal graphite is spread over the outside surface of the manganese dioxide layer. A first and a second lead are soldered or attached by pressure to the metal body serving as the anode and the colloidal graphite layer serving as the cathode, respectively. The manganese dioxide layer is provided by the method which includes the steps of: immersing the metal anode body having the oxide film formed on the surface thereof, into a mixture of an aqueous solution of manganous nitrate and an organic reducing agent, such as formamide; and heating the immersed metal body and said mixture to a temperature below 250° C. so as to cause heat decomposition of the manganese nitrate. The addition of an organic reducing agent to the aqueous solution of manganous nitrate lowers the temperature of heat decomposition and thereby avoids any damage to the oxide film which would otherwise be caused by heat and thus provides a solid electrolytic capacitor having small current leakage.

According to the conventional methods, the manganese dioxide layer was obtained by the heat-decomposition of the aqueous solution of manganous nitrate at temperatures above 300° C., at which temperature the oxide film is thermally damaged. This damage results in an increase in the leakage current at the oxide film after the manganese dioxide layer has been deposited. The increased leakage current is greater than that before the completion of the formation process for said manganese dioxide layer or that immediately after the oxide layer has been formed in the electrolyte. It will thus be appreciated that the temperature of heat decomposition of manganese dioxide must be lowered in order to avoid the thermal damage of the oxide film. As a result of a number of tests, it has now been found that it is possible to lower the temperature of heat decomposition considerably by mixing into the aqueous solution of manganous nitrate an organic reducing agent, such as formamide, formic acid, glycolic acid, formaldehyde, or acetaldehyde. More particularly, if the concentration of the aqueous solution of manganous nitrate is 50 percent by weight and if the time interval for the heat decomposition is set at five minutes, then the loss factors (tan δ) obtained at 120 c.p.s. for the various additional organic reducing agents (each with varying percentages by volume) with the respective decomposition temperatures, are as follows:

| | | | |
|---|---|---|---|
| (1) Formamide: | | | |
| Volume percent | 10 | 20 | 30 |
| Decomposition temperature, ° C | 220 | 190 | 180 |
| Loss factor, percent | 4 | 4 | 6 |
| (2) Formic acid: | | | |
| Volume percent | 10 | 15 | 20 |
| Decomposition temperature, ° C | 210 | 190 | 190 |
| Loss factor, percent | 5 | 6 | 7 |
| (3) Glycolic acid: | | | |
| Volume percent | 10 | 20 | 30 |
| Decomposition temperature, ° C | 230 | 210 | 200 |
| Loss factor, percent | 4 | 4 | 7 |

In the above tests, the time interval for the heat decomposition as set at five minutes mainly for the practical purpose of not excessively lengthening the time required for manufacture. Also, the manganous nitrate concentration of 50 percent was selected as one of many suitable for practical application. Higher concentration would normally be preferred and one such higher concentration of the saturated aqueous solution of manganous nitrate would be 63 percent at 25° C. Results obtained with different concentration of aqueous solution of manganous nitrate and with different time intervals for heat decomposition were either of the same order as or somewhat inferior to those given above.

As the above tests indicate, an increase in the concentration of an organic reducing agent lowers the decomposition temperature. A concentration of 10 percent, however, is believed desirable in consideration of the economic aspects and in view of the fact that the loss factor tends to increase when concentration exceeds 20 percent.

The above-mentioned and other features and objects of this invention and the means of attaining them will become more apparent and the invention itself will be best understood by reference to the following description of embodiments of the invention taken in conjunction with the accompanying drawings in which:

FIG. 1 is a longitudinal sectional view of a solid electrolytic capacitor formed according to this invention.

Figure 2:
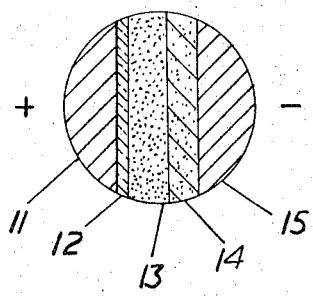

FIG. 2 shows an enlarged portion of the capacitor of FIG. 1 (in cross-section) at point 20 where the body 11 meets the solder mass 15.

The capacitor of FIG. 1 is obtained as follows: The sintered tantalum body 11 weighing about 1.5 grams is immersed in a 0.1% aqueous solution of phosphoric acid which is supplied with 150 volts D.C. for about six hours at 85° C. to form on the surfaces thereof an oxide film having a thickness of about 0.3 micron. Although not clearly shown in the drawings, the oxide film entirely covers all the tantalum particles forming the relatively rough surface of the sintered tantalum body 11. These particles are left unconnected to one another after sintering. As is known these particles are responsible for the excessively large electrostatic capacity of a solid tantalum capacitor with respect to its volume. The sintered tantalum body 11 having the oxide film 12 (shown in FIG. 2) is put into a mixture of an aqueous solution of manganous nitrate of 50% by weight and formamide of 10% by volume for five minutes with the liquid mixture held at 50° C. The tantalum body with the liquid mixture adsorbed and occluded thoroughly therein is then heated for five minutes at 230° C. in an electric oven to heat-decompose the adsorbed and occluded liquid mixture into manganese dioxide. The process of immersion and heat decomposition are repeated five times so that a manganese dioxide layer 13 (shown in FIG. 2) may be deposited densely on the whole exposed surface of the oxide film 12 disposed within and along the outside surface of the sintered tantalum body 11. The outside surface of the manganese dioxide layer 13 is then coated with a layer of colloidal graphite 14 also shown in FIG. 2. The assembly is then placed within a case 17 with a cathode lead wire 16, by means of solder shown at 15. An anode lead wire 18 is attached to the sintered tantalum body 11 and fixed to the case 17 by means of a hermetic seal member 19 which also serves as an insulator.

A solid electrolytic capacitor manufactured according to the invention and provided with an electrostatic capacity of 10 µf. (120 c.p.s.) gave the following results in comparison with a capacitor manufactured according to a conventional method and provided with the same electrostatic capacity:

| Method of manufacture | That of the invention | A conventional one |
|---|---|---|
| Loss factor (120 c.p.s.), percent | 4.5 | 3.5 |
| Leakage current (35 v. D.C.) | *0.00005 | *0.01 |
| Leakage current (50 v. D.C.) | *0.0001 | *0.2 |

*µA/(µf.×V).

As seen from the above results, the leakage current of a solid tantalum capacitor according to the method of this invention is very much smaller than that of capacitors formed by conventional methods. Thus, this invention allows the working voltage of capacitors to be raised from the conventional value of 35 volts D.C. to some 50 through 60 volts D.C. Incidentally, the leakage current of a solid tantalum capacitor manufactured according to the invention is nearly equal to that, (although its specific values are not given in the foregoing) observed immediately after completion of the formation of the oxide film. This indicates that the oxide film undergoes scarcely any thermal damage with the method of the invention. As for the loss factor obtained for capacitors formed according to the method of the invention, it is admitted that it is not as good as that obtained by conventional methods. However, the loss factor obtained falls within the workable standards.

In the described embodiment, reference has been had to a sintered tantalum body as the anode metal body 11 on which an oxide film may be formed. It is to be noted, however, that similar results may be obtained with a solid mass or a sintered body of aluminum, niobium, zirconium, and titanium. Also, the description has designated colloidal graphite as the material to be used to form the conductive layer 13. However, it should be noted that layer 13 may be formed by use of many other materials such as silver paste or other metal paste.

While we have described above the principles of our invention in connection with specific embodiments, it is to be clearly understood that this description is made only by way of example, and not as a limitation to the scope of our invention as set forth in the objects thereof and in the accompanying claims.

What is claimed is:
1. In an improved method for manufacturing a solid electrolytic capacitor having a metal body anode, an oxide film of said metal covering said body, a manganese dioxide layer overlaying said oxide film, a conductive cathode layer overlaying said manganese dioxide layer and leads connected to said anode and cathode, the steps comprising:
   (a) selecting said metal body from the group consisting of: aluminum, tantalum, niobium, zirconium and titanium
   (b) forming said oxide layer on said selected metal body
   (c) immersing said metal body with said oxide film deposited thereon, in a liquid mixture of an aqueous solution of manganous nitrate and an organic reducing agent selected from the group consisting of formamide, formic acid, glycolic acid, formaldehyde, and acetaldehyde, the amount of said inorganic reducing agent being in the range of about 10% to 20% by volume;
   (d) heating said mixture, including the immersed body at a temperature below 300° C. until a layer of managese dioxide of desired thickness is deposited over said oxide layer; and
   (e) thereafter overlaying said managese dioxide layer with a layer of a conductive material.

2. In the method for manufacturing a solid electrolytic capacitor, the steps comprising:
   (a) selecting a solid metal body from the group consisting of aluminum, tantalum, niobium, zirconium and titanium, which body is to act the anode of the capacitor;
   (b) depositing an oxide film on the surface of said metal body;
   (c) depositing a manganese dioxide layer over said dioxide film by
      (1) immersing said body with said oxide film in a liquid mixture containing an aqueous solution of manganous nitrate and an organic reducing agent selected from the group consisting of formamide, formic acid, glycolic acid, formaldehyde, and acetaldehyde, the amount of said organic reducing agent being in the range of about 10% to 20% by volume;
      (2) heating said body with said film and said liquid mixture at a temperature below 300° C. to decompose said mixture and deposit said manganese dioxide layer over said oxide layer, whereby said manganese dioxide layer is deposited without substantial damage to the oxide layer;
   (d) covering said manganese dioxide layer with a layer with a layer of a conductive material which is to act as the cathode of said capacitor; and
   (e) connecting leads to said anode and cathode.

3. In the method of claim 2 wherein the liquid mixture contains an aqueous solution of manganous nitrate having a concentration of about 50% to 63% by weight and the organic reducing agent is added to be about 10% volume.

4. In the method according to claim 2 wherein the conductive layer is formed from the group of materials consisting of: a colloidal graphite, and a metal paste.

5. In the method according to claim 2 wherein the metal body is titanium.

6. In the method of claim 2 wherein the oxide film is an oxide of the anode metal body.

References Cited by the Examiner
UNITED STATES PATENTS

| | | | |
|---|---|---|---|
| 3,029,370 | 4/1962 | Hill | 317—258 X |
| 3,093,883 | 6/1963 | Haring | 29—25.42 |
| 3,100,329 | 8/1963 | Sherman | 29—25.31 |
| 3,222,751 | 12/1965 | Fuss | 29—25.31 |

JOHN F. CAMPBELL, *Primary Examiner.*

WHITMORE A. WILTZ, *Examiner.*

W. I. BROOKS, *Assistant Examiner.*